United States Patent

Fenny et al.

(10) Patent No.: US 8,201,490 B2
(45) Date of Patent: Jun. 19, 2012

(54) BALLISTICALLY TOLERANT LINEAR HYDRAULIC ACTUATOR

(75) Inventors: Carlos A Fenny, Arlington, TX (US); Brent C Ross, Haslet, TX (US); John R Barber, Jr., Arlington, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 804 days.

(21) Appl. No.: 12/300,014

(22) PCT Filed: May 8, 2007

(86) PCT No.: PCT/US2007/011233
§ 371 (c)(1),
(2), (4) Date: Nov. 7, 2008

(87) PCT Pub. No.: WO2008/057142
PCT Pub. Date: May 15, 2008

(65) Prior Publication Data
US 2009/0133574 A1    May 28, 2009

Related U.S. Application Data

(60) Provisional application No. 60/798,780, filed on May 8, 2006.

(51) Int. Cl.
*F15B 11/036* (2006.01)
*B64C 13/00* (2006.01)
(52) U.S. Cl. .................................. 92/151; 92/52; 92/53
(58) Field of Classification Search .............. 92/51, 52, 92/53, 146, 150, 151, 161
See application file for complete search history.

(56) References Cited

U.S. PATENT DOCUMENTS

| | | | | |
|---|---|---|---|---|
| 3,371,582 A | * | 3/1968 | Schmidt | 92/52 |
| 3,566,748 A | * | 3/1971 | Mahler | 92/151 |
| 3,768,371 A |   | 10/1973 | Orme | |
| 3,972,396 A |   | 8/1976 | Bochnak | |
| 4,185,542 A | * | 1/1980 | York et al. | 92/166 |
| 4,296,677 A | * | 10/1981 | Little et al. | 92/151 |
| 4,300,439 A | * | 11/1981 | Degnan et al. | 92/146 |
| 4,449,446 A | * | 5/1984 | Degnan et al. | 92/146 |
| 4,867,044 A | * | 9/1989 | Holtrop | 92/169.1 |
| 2004/0163386 A1 |   | 8/2004 | Kopp et al. | |

OTHER PUBLICATIONS

Chinese Office Action from the Chinese counterpart Application No. 200780016779.4, issued by the Patent Office of China on Oct. 27, 2010.
Japanese Office Action from the counterpart Patent Application No. 2009-509841 issued by the Patent Office of Japan on Sep. 9, 2011.

(Continued)

*Primary Examiner* — Thomas E Lazo
(74) *Attorney, Agent, or Firm* — James E. Walton; Richard G. Eldredge

(57) ABSTRACT

A hydraulic actuator has an armored section having concentric cylinders and an unarmored section having a cylinder with a frangible piston and a frangible upper gland nut. The hydraulic actuator may have leakage vents adapted to prevent leakage between hydraulic systems used to power the cylinders. The hydraulic actuator also may have a gland seal for sealing an end of the cylinder of the unarmored section and a sensing port adapted for allowing detection of fluid leaking due to damage of the gland seal.

14 Claims, 5 Drawing Sheets

OTHER PUBLICATIONS

Canadian Office Action dated Apr. 20, 2010 from corresponding Patent Application No. 2,650,292.

Extended European Search Report from the counterpart EP Patent Application No. 07867111.2 issued by the European Patent Office on Sep. 26, 2011.

Chinese Examination Report from the counterpart CN Patent Application No. 200780016779.4 issued by the CN Patent Office on Jan. 13, 2012.

* cited by examiner

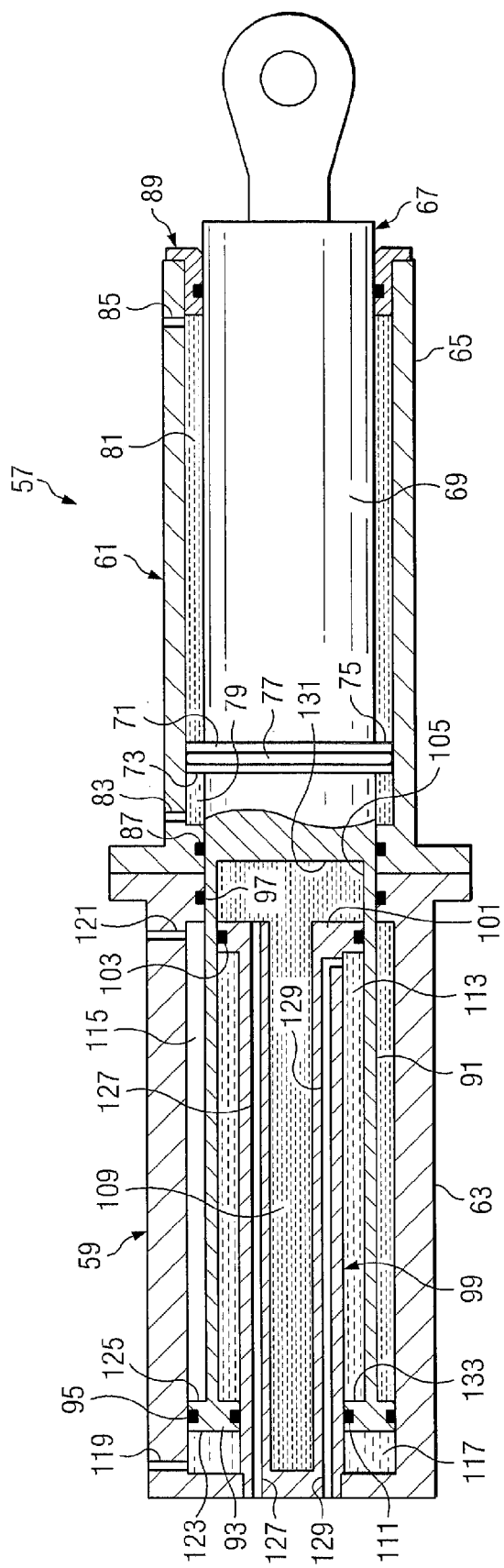
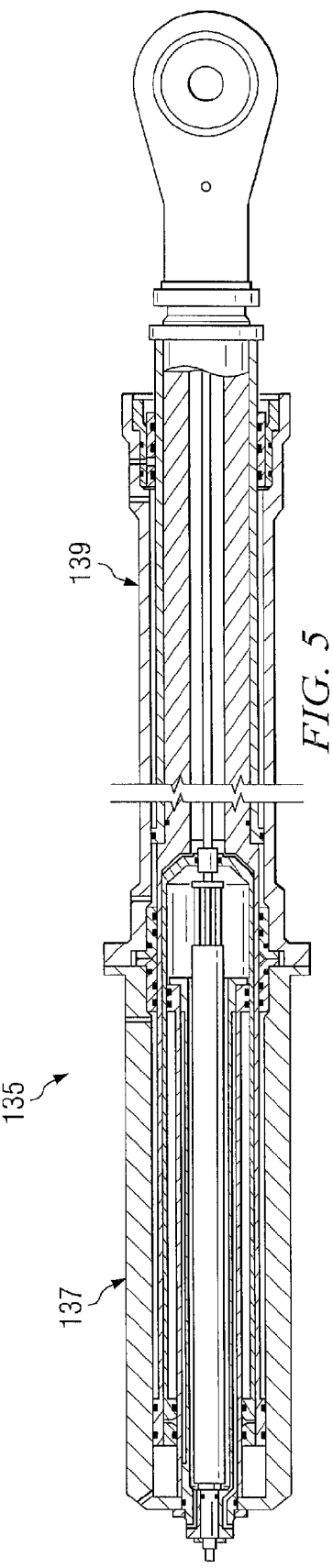
*FIG. 4*
*FIG. 5*

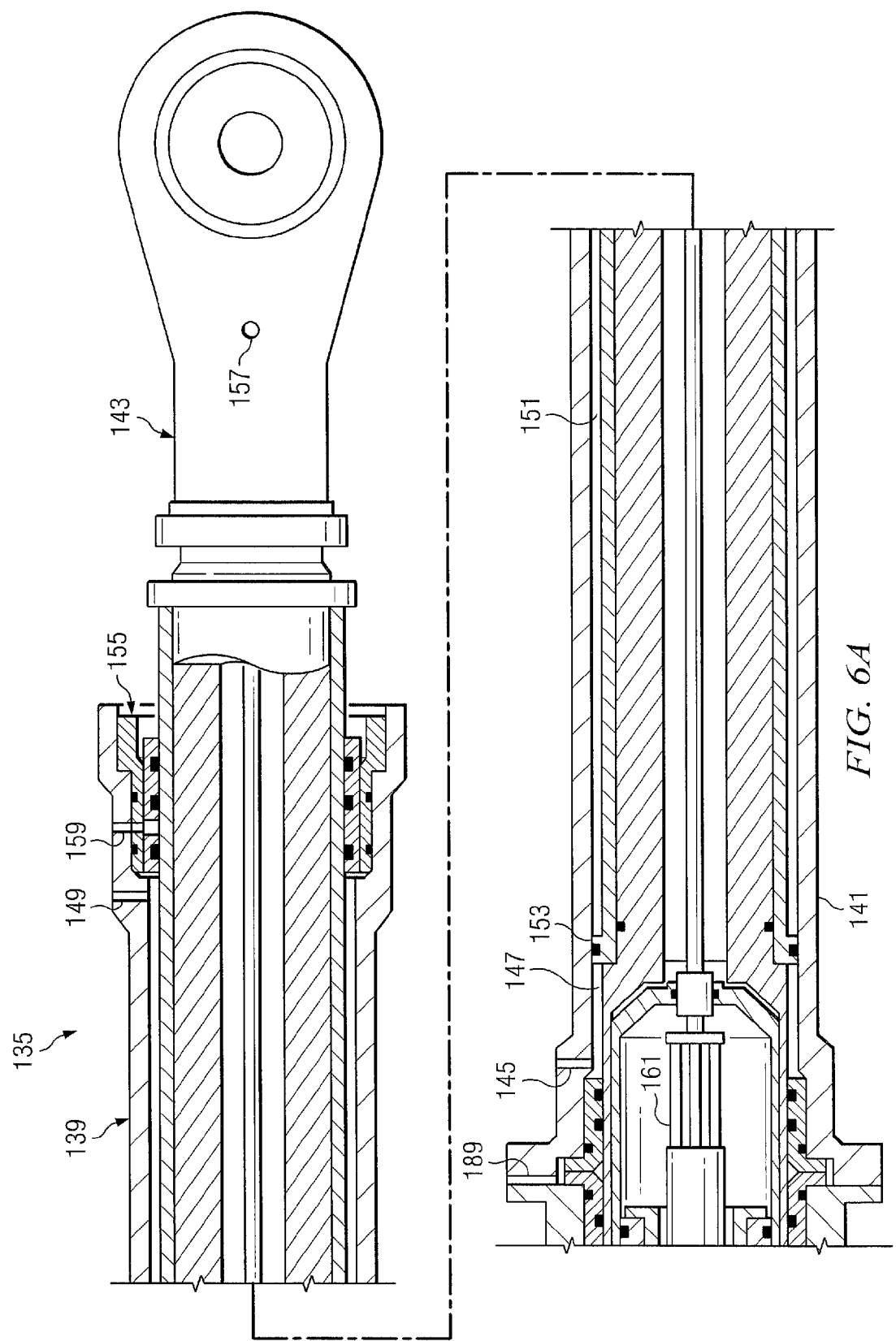

BALLISTICALLY TOLERANT LINEAR HYDRAULIC ACTUATOR

TECHNICAL FIELD

The technical field is ballistically tolerant linear hydraulic actuators.

DESCRIPTION OF THE PRIOR ART

Many types of linear hydraulic actuators are used in aircraft for positioning aircraft components. These may include components such as flight control surfaces, speedbrakes, and landing gear. In order to provide for redundancy in the systems, dual or triple actuators will often be used, and these may be used with two or more hydraulic systems for powering the actuators.

One example of a dual concentric actuator, which is shown in FIG. 1, has been used for speedbrakes on the Boeing F/A-18 aircraft. Actuator 11 comprises a central hydraulic retract chamber 13 having a piston 15 fixed to the stationary end and a concentric outer hydraulic actuator retract chamber 17 having a piston 19 attached to the moving end. For actuator extension there is a single extend chamber 20.

Currently there are two technologies utilized to provide triplex redundancy for critical flight control actuators used on helicopters and tiltrotors. FIG. 2 shows a prior-art configuration of a hydraulic actuator system 21 for flight control actuators 23, 25 as used on the Bell/Boeing V-22 tiltrotor aircraft. System 21 is used, for example, to position a flight control device 27. Because configuring three actuator cylinders end-to-end in tandem results in an excessively large actuator envelope, system 21 uses a dual tandem actuator 23 and uses a switching valve 29 to allow one of two different hydraulic systems 31, 33 to power one of the two cylinders within actuator 23. The configuration of system 21 does not provide full-triplex redundancy and is therefore not as reliable as a true triplex actuator system.

FIG. 3 shows a prior-art configuration of a hydraulic actuator system 35 for flight control actuators 37, 39, 41 as used on the Bell/Agusta BA609 tiltrotor aircraft. System 35 is used, for example, to position a flight control device 43. System 35 provides a compact fully-triplex actuator system by positioning the three cylinders 45, 47, 49 side by side in a triangular configuration, and this configuration provides higher reliability than the dual tandem with switching valve configuration of system 21 of FIG. 2. However, because all three exposed rams 51, 53, 55 and cylinders 45, 47, 49 must be armored or otherwise designed to provide ballistic protection, this configuration does not lend itself to military applications.

BRIEF DESCRIPTION OF THE DRAWINGS

FIG. 4 is a schematic cross-sectional view of an embodiment of a ballistically tolerant hydraulic actuator.

FIG. 5 is a detailed cross-sectional view of an embodiment of a ballistically tolerant hydraulic actuator.

FIG. 6A is an enlarged schematic cross-sectional view of a portion of the ballistically tolerant hydraulic actuator of FIG. 5.

DESCRIPTION OF THE PREFERRED EMBODIMENT

Figure 1:
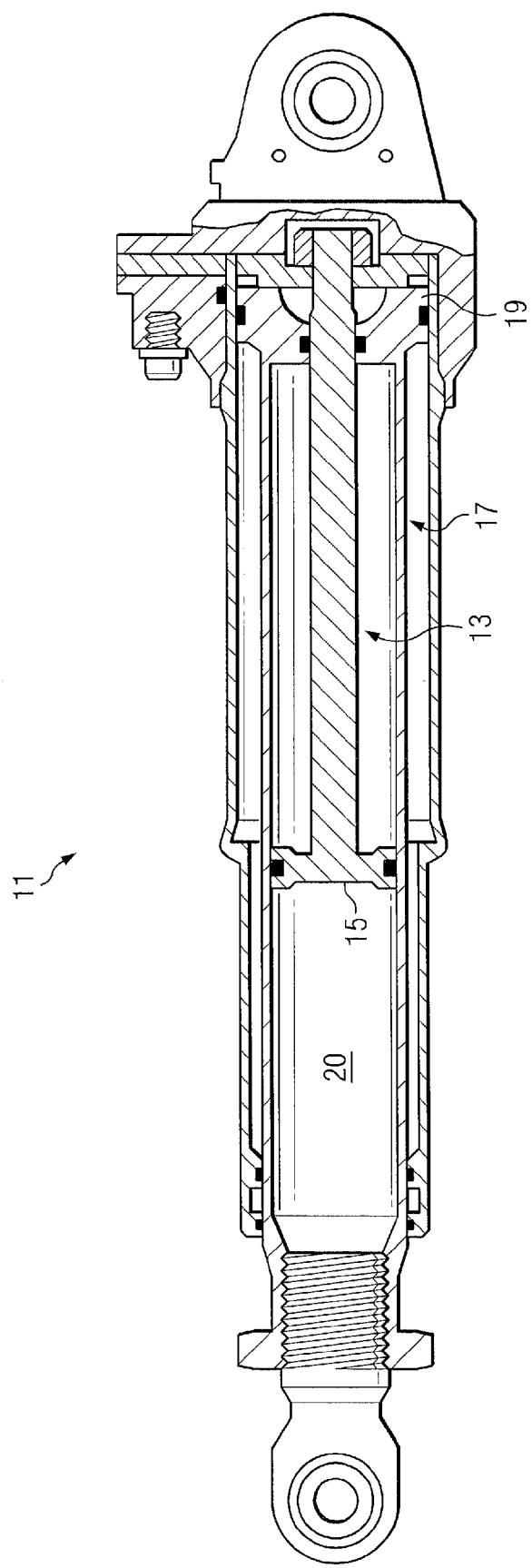
FIG. 1 is a schematic cross-sectional view of a prior-art dual concentric hydraulic actuator.
Figure 2:
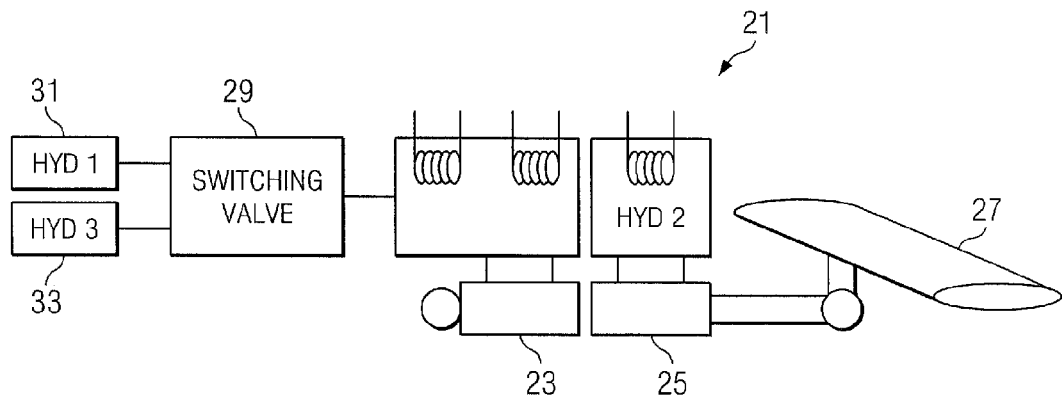
FIG. 2 is a schematic view of a prior-art configuration of a hydraulic actuator system.
Figure 3:
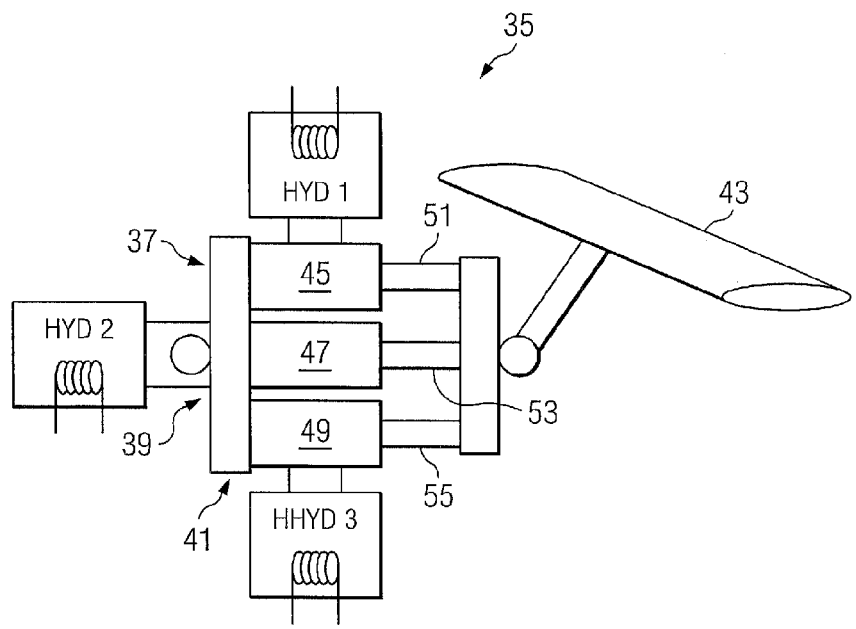
FIG. 3 is a schematic view of a prior-art configuration of a hydraulic actuator system.

To overcome the ballistic issues with side-by-side, parallel-configuration actuators, an embodiment of an actuator provides a triplex tandem actuator that fits in an actuator envelope only slightly larger than a V-22 dual tandem actuator having the same stroke length. The triplex tandem actuator configuration with concentric lower cylinders provides improved ballistic tolerance by providing two armored cylinders plus one unarmored cylinder, as compared to the current V-22 configuration, in which one armored cylinder and one unarmored cylinder are used. Additionally, the actuator has through-the-ram leakage vent holes to prevent intersystem leakage and a sensing port for sensing when there is a damaged upper gland seal. Reliability is also improved by the elimination of switching valves and by providing full triplex redundancy.

FIG. 4 is a schematic cross-sectional view of an embodiment of a triplex tandem actuator 57. Actuator 57 comprises a dual concentric cylinder configuration in an armored section 59 and a single cylinder configuration in an unarmored section 61. Armored section 59 comprises an armored outer wall 63 that minimizes the damage caused by ballistic impacts to section 59. Armored wall 63 may be formed of any appropriate material, such as armor plating, and encloses a volume divided into two concentric actuator cylinders, whereas unarmored section 61 comprises an outer wall 65 that encloses a volume configured to act as one actuator cylinder. Sections 59, 61 are joined to each other in a coaxial arrangement.

A ram 67 extends through section 61 and into section 59. Ram 67 has a cylindrical portion 69 located within section 61, and a circumferential, frangible piston 71 is formed on an outer surface of cylindrical portion 69. Piston 71 has opposing surfaces 73, 75, and piston 71 is sealed to an inner surface of outer wall 65 with seal 77, defining annular fluid volumes 79, 81 within section 61. An extend port 83 extends through outer wall 65 and communicates with fluid volume 79, and a retract port 85 extends through outer wall 65 and communicates with fluid volume 81. A seal 87 sealingly engages ram 67 and outer wall 65, and this seals the end of fluid volume 79 opposite piston 71. A frangible nut and gland seal assembly 89 also sealingly engages ram 67 and outer wall 65 for sealing the end of fluid volume 81 opposite piston 71.

Ram 67 has a skirt portion 91 that extends into section 59 and terminates in a piston 93. An outer surface of piston 93 is sealed to outer wall 63 with seal 95, and skirt 91 is sealed to outer wall 63 with seal 97. Skirt 91 encloses an inner valve member 99 that is connected to outer wall 63 and terminates in a piston 101. A seal 103 sealingly engages piston 101 to an inner surface 105 of skirt 91, defining a fluid volume 109. A seal 111 seals an inner surface of piston 93 of ram 67 to valve member 99, and seals 103, 111 cooperate to define annular fluid volume 113. Seals 95, 97 cooperate to define annular fluid volume 115, and seals 95, 111 cooperate to define annular fluid volume 117.

An extend port 119 extends through outer wall 63 and communicates with fluid volume 117, and a retract port 121 extends through outer wall 63 and communicates with fluid volume 115. Pressure in fluid volume 117 acts on surface 123 of piston 93, and pressure in fluid volume 115 acts on surface 125 of piston 93.

An extend port 127 extends through valve member 99 and communicates with fluid volume 109, and a retract port 129 extends through valve member 99 and communicates with fluid volume 113. Pressure in fluid volume 109 acts on piston surface 131 of ram 67, and pressure in fluid volume 113 acts on surface 133 of piston 93.

In operation, ram 67 may be extended by applying fluid pressure through any one of extend ports 83, 119, and 127 and into the corresponding fluid volumes 79, 109, 117. The fluid pressure acts on the associated piston surface 73, 123, 131 to cause ram to extend out of actuator 57. Likewise, ram 67 may be retracted by applying fluid pressure through any one of retract ports 85, 121, and 129 and into the corresponding fluid volumes 81, 113, 115. The fluid pressure acts on the associated piston surface 75, 125, 133 to cause ram to retract into actuator 57. In the event of ballistic damage to unarmored section 61, ram 67 may still be extended and retracted using the cylinders within armored section 59. If one of the concentric cylinders within armored section 59 is damaged, the other of the cylinders may still be used to position ram 67.

Figure 6B:
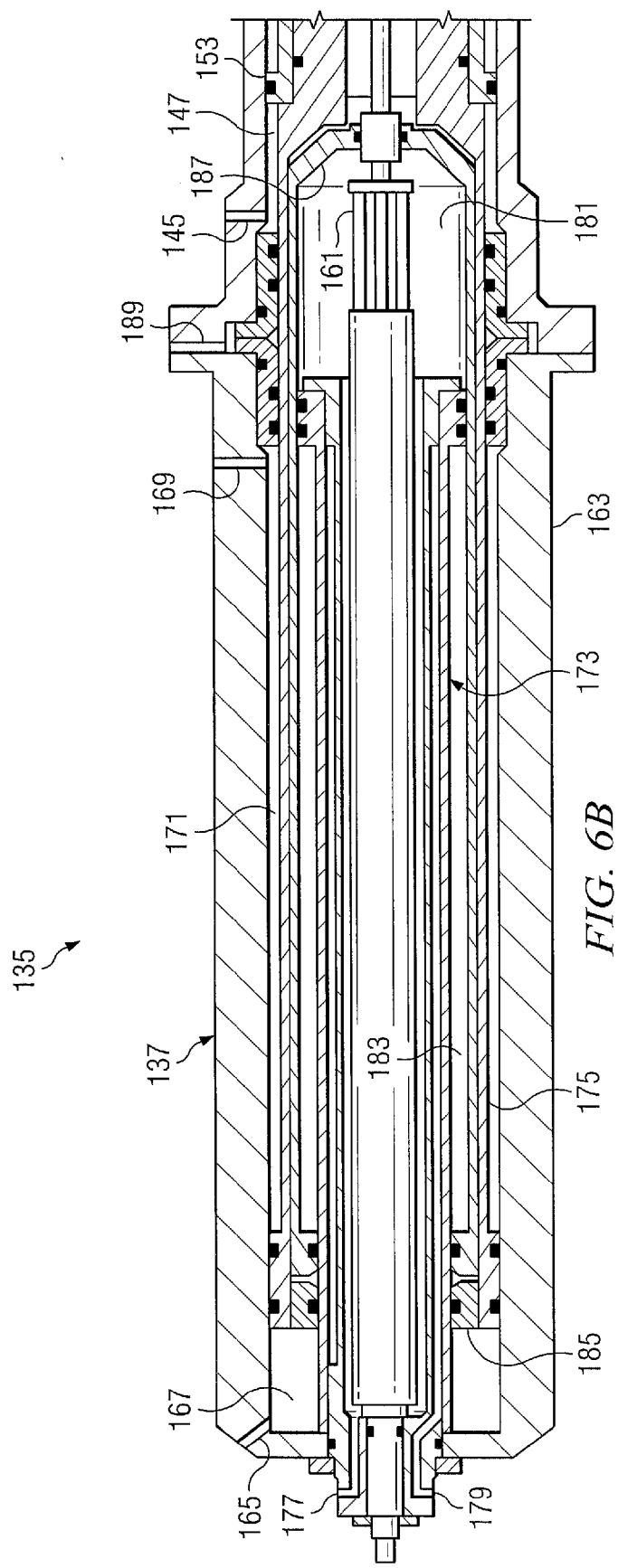
FIG. 6B is an enlarged schematic cross-sectional view of a portion of the ballistically tolerant hydraulic actuator of FIG. 5.

FIG. 5 is a detailed cross-sectional view of another embodiment of a triplex tandem actuator, and FIGS. 6A and 6B are enlarged, detailed, cross-sectional views of the actuator of FIG. 5.

FIG. 5 shows a triplex tandem actuator 135 that has a similar configuration to actuator 57, which is described above. Actuator 135 comprises a dual concentric cylinder configuration in an armored section 137 and a single cylinder configuration in an unarmored section 139. FIG. 6A is an enlarged view of unarmored section 139, and FIG. 6B is an enlarged view of unarmored section 137.

Unarmored section 139 has an unarmored outer wall 141 that forms a single cylinder actuator for moving ram 143. An extend port 145 extends through outer wall 141 and communicates with annular fluid volume 147, and a retract port 149 extends through outer wall 141 and communicates with annular fluid volume 151. In a similar manner to that described above for actuator 57, pressure in fluid volume 147 acts on the corresponding surface of a frangible piston 153 to extend ram 143, and pressure in fluid volume 151 acts on the opposite surface of piston 153 to retract ram 143. A frangible nut and gland seal assembly 155 is used to seal the end of fluid volume 151 opposite piston 153. A leakage vent 157 is provided in ram 143 to allow for venting of fluid that has leaked from the hydraulic system in section 139. Also, a sensing port 159 is provided in outer wall 141 for allowing sensing of fluid leakage indicative of a damaged gland seal in assembly 155. A triplex linear variable differential transformer 161 is provided for measuring the amount of displacement of ram 143 during operation of actuator 135.

Use of sensing port 159 allows for protection of the hydraulic system powering section 139. If flow to port 159 (indicating a damaged gland seal assembly 155) is detected, a flight control computer can configure a manifold (not shown) feeding section 139 into a bypass/shutoff configuration to isolate the leak. This keeps section 139 from depleting the fluid in the system following damage to gland seal assembly 155 and isolates the leak at its source.

Armored section 137 has an armored outer wall 163 that forms a dual concentric cylinder actuator for moving ram 143. An extend port 165 extends through outer wall 163 and communicates with annular fluid volume 167, and a retract port 169 extends through outer wall 163 and communicates with annular fluid volume 171. A valve member 173 is located within a skirt portion 175 of ram 143, and an extend port 177 and a retract port 179 extend through valve member 173. Valve member 173 is attached to outer wall 163 and does not move with ram 143. Extend port 177 communicates with fluid volume 181, and retract port 179 communicates with annular fluid volume 183. In a similar manner to that described above for actuator 57, pressure in fluid volume 167 acts on the corresponding surface of a piston 185 to extend ram 143, and pressure in fluid volume 171 acts on an opposite surface of piston 185 to retract ram 143. Likewise, pressure in fluid volume 181 acts on inner surface 187 of ram 143 to extend ram 143, and pressure in fluid volume 183 acts on a corresponding surface of piston 185 to retract ram 143. A leakage vent 189 is provided near the interface of section 137, 139 to allow for venting of fluid that has leaked from either or both hydraulic systems in section 137.

In the preferred embodiment, the size and weight of the triplex tandem actuator cylinder assembly is only slightly more that a similar dual tandem actuator. The required large ram diameter creates the space required for the third cylinder within the ram. Because the V-22 and many new aircraft will be using hydraulic systems operating in the range of 5,000 psi, very little effective piston area is required to produce desired cylinder operation. The only significant weight difference between a dual tandem actuator and the triplex tandem actuator is the addition of a third control manifold to operate the third cylinder, though this weight gain is balanced by the elimination of switching and isolation valves.

Whether dual or triplex in configuration, each actuator cylinder is to be sized by the load required for safe operation on one operating cylinder. Because the armor of the armored section protects two systems, damage to the unarmored section does not significantly degrade the flight envelope.

The triplex tandem actuator provides for several advantages, including: 1) providing critical flight control actuation for military aircraft requiring ballistic protection; 2) providing increased reliability with no significant envelope or weight impact; and 3) providing ballistic protection with no significant envelope or weight impact.

This description includes reference to illustrative embodiments, but it is not intended to be construed in a limiting sense. Various modifications and combinations of the illustrative embodiments, as well as other embodiments, will be apparent to persons skilled in the art upon reference to the description.

The invention claimed is:

1. A linear hydraulic actuator, comprising:
   an armored section having:
      concentric cylinders;
      a first fluid volume; and
      a second fluid volume, wherein the first and second fluid volumes are at least partially concentric fluid volumes;
   an unarmored section having:
      a cylinder with a frangible piston and a frangible upper gland nut; and
      a third fluid volume;
   a first port, the first port being in fluid communication with the first fluid volume;
   a second port, the second port being in fluid communication with the second fluid volume; and
   a third port, the third port being in fluid communication with the third fluid volume.

2. The hydraulic actuator according to claim 1, further comprising:
   a gland seal for sealing an end of the cylinder of the unarmored section;
   a sensing port adapted for allowing detection of fluid leaking due to damage of the gland seal.

3. The hydraulic actuator according to claim 1, wherein the armored section and the unarmored section are adjacent one another in a tandem configuration.

4. The hydraulic actuator according to claim 1, further comprising a ram, wherein the ram is configured to extend whenever fluid is added to the first fluid volume via the first port, and wherein the ram is configured to extend whenever fluid is added to the second fluid volume via the second port.

5. The hydraulic actuator according to claim 1, further comprising a ram, wherein the ram is configured to retract whenever fluid is added to the first fluid volume via the first port, and wherein the ram is configured to retract whenever fluid is added to the second fluid volume via the second port.

6. The hydraulic actuator according to claim 1, further comprising a ram, wherein:
   the ram is configured to extend whenever fluid is added to the first fluid volume via the first port;
   the ram is configured to extend whenever fluid is added to the second fluid volume via the second port; and
   the ram is configured to extend whenever fluid is added to the third fluid volume via the third port.

7. The hydraulic actuator according to claim 1, further comprising a ram, wherein:
   the ram is configured to retract whenever fluid is added to the first fluid volume via the first port;
   the ram is configured to retract whenever fluid is added to the second fluid volume via the second port; and
   the ram is configured to retract whenever fluid is added to the third fluid volume via the third port.

8. A triplex hydraulic actuator system, comprising:
   an armored dual concentric hydraulic linear actuator having first and second at least partially concentric fluid volumes separately controllable for extending the actuator system; and
   an unarmored linear hydraulic actuator having a third fluid volume that is separately controllable from the first and the second fluid volumes for extending the actuator system;
   wherein the dual concentric hydraulic linear actuator and the unarmored linear hydraulic actuator are adjacent one another in a tandem configuration.

9. The hydraulic actuator system according to claim 8, further comprising:
   a gland seal for sealing an end of a cylinder located internally within the unarmored linear hydraulic actuator; and
   a sensing port adapted for allowing detection of fluid leaking due to damage of the gland seal.

10. The hydraulic actuator system according to claim 8, further comprising a ram, wherein the ram is configured to extend whenever fluid is added to either of the first and the second fluid volumes.

11. The hydraulic actuator system according to claim 8, further comprising a ram, wherein the ram is configured to extend whenever fluid is added to any one of the first, the second, and the third fluid volumes.

12. A triplex hydraulic actuator system, comprising:
   an armored dual concentric hydraulic linear actuator having first and second at least partially concentric fluid volumes separately controllable for retracting the actuator system; and
   an unarmored linear hydraulic actuator having a third fluid volume that is separately controllable from the first and the second fluid volumes for retracting the actuator system;
   wherein the dual concentric hydraulic linear actuator and the unarmored linear hydraulic actuator are adjacent one another in a tandem configuration.

13. The hydraulic actuator system according to claim 12, further comprising a ram, wherein the ram is configured to retract whenever fluid is added to either of the first and the second fluid volumes.

14. The hydraulic actuator system according to claim 12, further comprising a ram, wherein the ram is configured to retract whenever fluid is added to any one of the first, the second, and the third fluid volumes.

* * * * *